United States Patent
Aoki et al.

(10) Patent No.: US 9,617,438 B2
(45) Date of Patent: Apr. 11, 2017

(54) OILY INKJET INK

(75) Inventors: Satoshi Aoki, Ibaraki-ken (JP);
Manami Shimizu, Ibaraki-ken (JP);
Kyoko Motoyama, Ibaraki-ken (JP)

(73) Assignee: RISO KAGAKU CORPORATION, Tokyo (JP)

( * ) Notice: Subject to any disclaimer, the term of this patent is extended or adjusted under 35 U.S.C. 154(b) by 1136 days.

(21) Appl. No.: 13/168,722

(22) Filed: Jun. 24, 2011

(65) Prior Publication Data

US 2011/0315049 A1    Dec. 29, 2011

(30) Foreign Application Priority Data

Jun. 29, 2010    (JP) ................................. 147662/2010

(51) Int. Cl.
*C09D 11/36*    (2014.01)
*C09D 11/322*    (2014.01)

(52) U.S. Cl.
CPC ............ *C09D 11/322* (2013.01); *C09D 11/36* (2013.01)

(58) Field of Classification Search
CPC ....................................................... C09D 11/36
USPC ....................................................... 106/31.86
See application file for complete search history.

(56) References Cited

U.S. PATENT DOCUMENTS

| 2005/0020728 | A1* | 1/2005 | Nagaswa et al. | 523/160 |
| 2007/0101901 | A1* | 5/2007 | Endo et al. | 106/31.86 |
| 2008/0097013 | A1* | 4/2008 | Mizutani | 524/107 |
| 2010/0242795 | A1* | 9/2010 | Endo | 106/31.86 |

FOREIGN PATENT DOCUMENTS

| JP | 2003-268266 A | 9/2003 |
| JP | 2004-137315 A | 5/2004 |
| JP | 2005-132786 A | 5/2005 |
| JP | 2007-126564 A | 5/2007 |
| JP | 2007-161890 A | 6/2007 |
| JP | 2008-275744 A | 11/2008 |
| JP | 2008-297494 A | 12/2008 |
| JP | 2009-275211 A | 11/2009 |

OTHER PUBLICATIONS

An Office Action; "Notification of Grounds for Rejection," issued by the Japanese Patent Office on Mar. 11, 2014, which corresponds to Japanese Patent Application No. 2010-147662 and is related to U.S. Appl. No. 13/168,722; with English language partial translation.

\* cited by examiner

*Primary Examiner* — Veronica F Faison
(74) *Attorney, Agent, or Firm* — Greenblum & Bernstein, P.L.C.

(57) ABSTRACT

An oily inkjet ink comprises a pigment, a pigment dispersant, and a solvent, wherein the solvent contains a hydrocarbon type solvent (A), a solvent (B) having at least an ester group and an ether group in one molecule, and a solvent (C) that is soluble in the hydrocarbon type solvent and the solvent having at least an ester group and an ether group in one molecule.

20 Claims, No Drawings

OILY INKJET INK

BACKGROUND OF THE INVENTION

Field of the Invention

This invention relates to an oily inkjet ink adapted for use in inkjet recording systems.

Description of the Related Art

Inkjet recording systems are the systems in which an inkjet ink having a high degree of fluidity is jetted out in the form of ink droplets from fine head nozzles, and in which an image is recorded by the ink droplets on printing paper located so as to stand facing the nozzles. Recently, the inkjet recording systems have rapidly become popular for the possibility of high speed printing by use of line head type inkjet recording apparatuses provided with a plurality of ink heads. As the inks for use in the inkjet recording systems, there have been proposed various oily inkjet inks, which contain a water-insoluble solvent and a pigment finely dispersed in the water-insoluble solvent.

For example, in Japanese Unexamined Patent Publication No. 2007-126564, the inventors proposed an ink, which contains a non-polar solvent, such as an ester solvent, a higher alcohol solvent, or a hydrocarbon solvent, and a pigment dispersed in the non-polar solvent. The proposed ink has the advantages in that the ink has excellent on-printer stability, and in that the ink yields a printed surface, which does not adhere to a print surface having been printed with a plain paper copier or a laser printer when being superimposed upon the print surface.

The oily inkjet ink is not an ink which dries and solidifies by itself, but is a penetration drying type ink which penetrates through a printed material, such as paper, and thereby dries. Therefore, in cases where high speed printing is performed, the period of time elapsing from the printing to the outputting becomes short, the problems with regard to the so-called "roller transfer staining" occur in that the ink having been printed on a paper surface and having not been dried is transferred to a conveying roller and then from the conveying roller to printed paper conveyed next, and thus stains the printed paper.

As a technique for improving fixing characteristics of an oily inkjet ink, Japanese Unexamined Patent Publication No. 2003-268266 describes that the fixing characteristics of the oily inkjet ink can be improved by adjusting the number of an ester group, the number of an ether group, and the carbon number of an alkyl group in a solvent. Also, as an oily inkjet ink having good penetrability on printed paper and having good fixing characteristics of the ink immediately after printing, Japanese Unexamined Patent Publication No. 2004-137315 proposes an ink which contains a hydrocarbon type solvent as a principal solvent and which contains an ester derivative of a (poly)alkylene glycol. Further, as an ink having good printing quality, Japanese Unexamined Patent Publication No. 2007-161890 proposes an oily inkjet ink containing a fatty acid ester and a non-aqueous polar solvent as solvents.

With the ink described in Japanese Unexamined Patent Publication No. 2004-137315, though an improvement in ink penetration drying characteristics is obtained, storage stability and jetting-out stability become bad due to low solubility between the solvents. The ink described in Japanese Unexamined Patent Publication No. 2007-161890 has the problems in that, in cases where the ink is used for printing on plain paper or reprocessed paper, the penetration drying characteristics become bad. The penetration drying characteristics of an oily inkjet ink depend markedly upon ink viscosity. However, the ink heads of the inkjet recording systems impose marked limitation of the ink viscosity, and therefore the viscosity adjustment is possible only within a viscosity range in which the ink can be jetted out. If the viscosity range in which the ink can be jetted out is ignored, the jetting-out stability and the storage stability will become bad. Therefore, it is not always possible to improve and enhance the penetration drying characteristics easily as described in Japanese Unexamined Patent Publication No. 2003-268266.

As described above, the penetration drying characteristics of the ink depend markedly upon the viscosity and affect the jetting-out stability and the storage stability. Therefore, the inventors eagerly studied with regard to whether or not the penetration drying characteristics can be controlled by constituent factors other than the viscosity, and found that, by the containing of solvents varying in polarity in the ink, the penetration drying characteristics are enhanced, and the roller transfer staining is suppressed. The present invention is based upon the findings described above.

SUMMARY OF THE INVENTION

The primary object of the present invention is to provide an oily inkjet ink, which has excellent penetration drying characteristics, which suppresses roller transfer staining of printed paper, and which has excellent jetting-out stability and excellent storage stability.

The present invention provides an oily inkjet ink, comprising: a pigment, a pigment dispersant, and a solvent,
wherein the solvent contains:
 i) a hydrocarbon type solvent (A),
 ii) a solvent (B) having at least an ester group and an ether group in one molecule, and
 iii) a solvent (C) that is soluble in the hydrocarbon type solvent and the solvent having at least an ester group and an ether group in one molecule.

The oily inkjet ink in accordance with the present invention should preferably be modified such that the solvent (B) has at least two pieces of the ester group and at least two pieces of the ether group in one molecule.

The oily inkjet ink in accordance with the present invention should more preferably be modified such that the solvent (B) is a diester that is formed from a dibasic acid and a (poly) alkylene glycol monoalkyl ether.

In such cases, the oily inkjet ink in accordance with the present invention should particularly preferably be modified such that the diester that is formed from a dibasic acid and a (poly)alkylene glycol monoalkyl ether is at least one of the members selected from the group consisting of bisethoxy diglycol cyclohexane dicarboxylate, bisethoxy diglycol succinate, and diethoxyethyl succinate.

Also, the oily inkjet ink in accordance with the present invention should preferably be modified such that the solvent (B) is constituted of triethylene glycol diacetate and/or isosorbide dicaprylate.

Further, the oily inkjet ink in accordance with the present invention should particularly preferably be modified such that the solvent (C) is constituted of at least one of the members selected from the group consisting of a higher fatty acid ester and a higher alcohol.

The hydrocarbon type solvent (A) contained in the oily inkjet ink in accordance with the present invention is the solvent having a low polarity. Also, the solvent (B) having at least an ester group and an ether group in one molecule is the solvent having a high polarity. It is considered that, in cases where both the solvent (A) having a low polarity and the solvent (B) having a high polarity are contained in the ink, the affinity between the solvents becomes bad, the solvent separability from the ink becomes high, and therefore the penetration rate of the ink through the printed paper becomes high.

Specifically, it is considered that the solvent (B), which has a high polarity, exhibits good wettability with respect to paper having a high polarity, such as mat paper provided with an ink receiving layer, coated paper, or plain paper containing a large amount of a filler, and that ink penetration through the paper thus becomes quick. It is also considered that, with respect to paper having a comparatively low polarity, such as reprocessed paper or ordinary type plain paper, by virtue of the solvent (A), which is sparingly soluble in the solvent (B), the solvent separation from the ink becomes quick at the time of the penetration of the ink through the paper, and the penetration rate of the ink through the paper becomes quick. More specifically, by the containing of the solvent (A) and the solvent (B) in the ink, instead of the ink viscosity being altered, the ink penetrability is enhanced with respect to various types of paper, and roller transfer staining of the printed paper is suppressed. Also, the jetting-out operation from the ink heads is performed reliably without being limited by the ink viscosity.

Further, although the hydrocarbon type solvent (A) and the solvent (B) having at least an ester group and an ether group in one molecule exhibit low compatibility with each other, by the containing of the solvent (C) that is soluble in the hydrocarbon type solvent and the solvent having at least an ester group and an ether group in one molecule, the compatibility of the solvents in the ink is retained, the solvent system becomes homogeneous, and therefore the storage stability of the ink becomes high.

DETAILED DESCRIPTION OF THE INVENTION

The oily inkjet ink (hereinbelow referred to simply as the ink) in accordance with the present invention comprises the pigment, the pigment dispersant, and the solvent, wherein the solvent contains: the hydrocarbon type solvent (A), the solvent (B) having at least an ester group and an ether group in one molecule, and the solvent (C) that is soluble in the hydrocarbon type solvent and the solvent having at least an ester group and an ether group in one molecule.

With the storage stability of the ink and the ink penetrability with respect to various types of paper being taken into consideration, solvent constituent proportions of the solvent (A), the solvent (B), and the solvent (C) should preferably be such that the proportion of the solvent (A) with respect to the entire solvent is selected within the range of 20 to 50 mass %, the proportion of the solvent (B) with respect to the entire solvent is selected within the range of 1 to 40 mass %, and the proportion of the solvent (C) with respect to the entire solvent is selected within the range of 20 to 70 mass %. The solvent constituent proportions should more preferably be such that the proportion of the solvent (A) with respect to the entire solvent is selected within the range of 25 to 50 mass %, the proportion of the solvent (B) with respect to the entire solvent is selected within the range of 5 to 35 mass %, and the proportion of the solvent (C) with respect to the entire solvent is selected within the range of 25 to 70 mass %.

The solvent (A) is the hydrocarbon type solvent. Examples of preferable hydrocarbon solvents include aliphatic hydrocarbon solvents, alicyclic hydrocarbon solvents, and aromatic hydrocarbon solvents. Examples of preferable aliphatic hydrocarbon solvents and preferable alicyclic hydrocarbon solvents include the solvents commercially available under the following trade names: Teclean N-16, Teclean N-20, Teclean N-22, Nisseki Naphtesol L, Nisseki Naphtesol M, Nisseki Naphtesol H, Solvent 0 L, Solvent 0 M, Solvent 0 H, Nisseki Isosol 300, Nisseki Isosol 400, AF-4, AF-5, AF-6, and AF-7 (each of which is manufactured by Nippon Oil Corporation); and Isopar G, Isopar H, Isopar L, Isopar M, Exxol D40, Exxol D80, Exxol D100, Exxol D130, and Exxol D140 (each of which is manufactured by Exxon Mobil Corporation). Examples of preferable aromatic hydrocarbon solvents include the solvents commercially available under the trade names of Nisseki Cleansol G (alkyl benzene) (manufactured by Nippon Oil Corporation) and Solvesso 200 (manufactured by Exxon Mobil Corporation).

The solvent (B) is the solvent having at least an ester group and an ether group in one molecule. The solvent (B) should preferably have at least two pieces of the ester group and at least two pieces of the ether group in one molecule. By the provision of at least two pieces of the ester group and at least two pieces of the ether group in one molecule, the polarity becomes high even further. Therefore, the solvent separability from the ink ingredients becomes high even further, and the penetration rate is enhanced even further. The number of the ester group in one molecule should preferably be selected within the range of two to ten, and should more preferably be selected within the range of two to five. The number of the ether group in one molecule should preferably be selected within the range of two to 30, and should more preferably be selected within the range of four to ten.

From the view points of the enhancement of the penetration rate and the suppression of an odor of the solvent, the solvent (B) should preferably be the diester that is formed from a dibasic acid and a (poly)alkylene glycol monoalkyl ether. Examples of preferable dibasic acids include the dibasic acids represented by the formula:

HO—CO—R—CO—OH wherein R represents a straight-chain, branched-chain, or cyclic hydrocarbon group having a carbon number of two to ten.

Specific examples of preferable dibasic acids include cyclohexanedicarboxylic acid, succinic acid, adipic acid, pimelic acid, suberic acid, sebacic acid, and dodecanedioic acid.

Examples of preferable (poly) alkylene glycol monoalkyl ethers include an ethylene glycol monoethyl ether, an ethylene glycol monopropyl ether, an ethylene glycol monoisopropyl ether, a diethylene glycol monoethyl ether, a triethylene glycol monoethyl ether, a diethylene glycol monopropyl ether, a triethylene glycol monopropyl ether, a diethylene glycol monoisopropyl ether, a triethylene glycol monoisopropyl ether, a diethylene glycol monoisobutyl ether, a triethylene glycol monoisobutyl ether, a propylene glycol monomethyl ether, a propylene glycol monoethyl ether, a propylene glycol monopropyl ether, a propylene glycol monoisopropyl ether, a propylene glycol monobutyl ether, a propylene glycol monoisobutyl ether, a dipropylene glycol monomethyl ether, a dipropylene glycol monoethyl ether, a dipropylene glycol monopropyl ether, a dipropylene glycol monoisopropyl ether, a dipropylene glycol monobutyl ether, a dipropylene glycol monoisobutyl ether, a tripropylene glycol monomethyl ether, a tripropylene glycol monopropyl ether, a tripropylene glycol monoisopropyl ether, a tripropylene glycol monobutyl ether, a tripropylene glycol monoisobutyl ether, a tetrapropylene glycol monomethyl ether, a tetrapropylene glycol monopropyl ether, a tetrapropylene glycol monoisopropyl ether, a tetrapropylene glycol monobutyl ether, a tetrapropylene glycol monoisobutyl ether, a butylene glycol monomethyl ether, a butylene glycol monoethyl ether, a butylene glycol monopropyl ether, a butylene glycol monoisopropyl ether, a butylene glycol monobutyl ether, a butylene glycol monoisobutyl ether, a dibutylene glycol monomethyl ether, a dibutylene glycol monoethyl ether, a dibutylene glycol monopropyl ether, a dibutylene glycol monoisopropyl ether, a dibutylene glycol monobutyl ether, a dibutylene glycol monoisobutyl ether, a tributylene glycol monomethyl ether, a tributylene glycol monopropyl ether, a tributylene glycol monoisopropyl ether, a tributylene glycol monobutyl ether, a tributylene glycol monoisobutyl ether, a tetrabutylene glycol monomethyl ether, a tetrabutylene glycol monopropyl ether, a tetrabutylene glycol monoisopropyl ether, a tetrabutylene glycol monobutyl ether, and a tetrabutylene glycol monoisobutyl ether.

From the view point of the availability, the diester that is formed from a dibasic acid and a (poly)alkylene glycol monoalkyl ether is at least one of the members selected from the group consisting of bisethoxy diglycol cyclohexane dicarboxylate (number of ester group: two, number of ether group: four), bisethoxy diglycol succinate (number of ester group: two, number of ether group: four), and diethoxyethyl succinate (number of ester group: two, number of ether group: two).

Examples of preferable solvents having at least an ester group and an ether group in one molecule also include ethylene glycol monobutyl ether acetate (number of ester group: one, number of ether group: one), isosorbide dicaprylate (number of ester group: two, number of ether group: two), triethylene glycol diacetate (number of ester group: two, number of ether group: two), and a polypropylene glycol succinic acid oligo ester (number of ester group: eight, number of ether group: 30, molecular weight: 2,000 to 3,000) (product name: Cosmol 102, manufactured by The Nisshin Oillio Group, Ltd.).

Each of the solvents enumerated above as the solvent (B) may be used alone, or two or more of the above-enumerated solvents may be used in combination.

The solvent (C) is the solvent that is soluble in the hydrocarbon type solvent and the solvent having at least an ester group and an ether group in one molecule. Specifically, the solvent (C) is the solvent that forms a transparent and single phase when being mixed with the hydrocarbon type solvent and the solvent having at least an ester group and an ether group in one molecule. The term "transparent" as used herein means that the turbidity is equal to at most 10 (as measured in accordance with JIS-K0101 visual turbidimetry (aqueous kaolin solution)). Examples of the solvents appropriate as the solvent (C) include a higher fatty acid ester, a higher alcohol, a higher fatty acid, and an ether.

The higher fatty acid ester should preferably have a carbon number of at least five in one molecule, should more preferably have a carbon number of at least nine in one molecule, and should most preferably have a carbon number of 12 to 32 in one molecule. Examples of preferable higher fatty acid esters include methyl laurate, isopropyl laurate, isopropyl myristate, isopropyl palmitate, octyl palmitate, methyl oleate, ethyl oleate, isopropyl oleate, butyl oleate, methyl linoleate, ethyl linoleate, isobutyl linoleate, isopropyl isostearate, isononyl isononanoate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate, and glyceryl tri-2-ethylhexanoate.

The higher alcohol should preferably have a carbon number of at least 12 in one molecule. Examples of preferable higher alcohols include isomyristyl alcohol, isopalmityl alcohol, isostearyl alcohol, and oleyl alcohol.

The higher fatty acid should preferably have a carbon number of at least four in one molecule, should more preferably have a carbon number of nine to 22 in one molecule. Examples of preferable higher fatty acids include isononanoic acid, isomyristic acid, hexadecanoic acid, isopalmitic acid, oleic acid, and isostearic acid.

Examples of preferable ethers include diethylene glycol monobutyl ethers, ethylene glycol monobutyl ethers, propylene glycol monobutyl ethers, and propylene glycol dibutyl ethers.

As the pigment, it is possible to use organic pigments and inorganic pigments, which are ordinarily used in the fields of the printing technique. No limitation is imposed upon the pigment. Specifically, it is possible to use a wide variety of known pigments, such as carbon black, cadmium red, chrome yellow, cadmium yellow, chromium oxide, viridian, Titan Cobalt Green, ultramarine blue, Prussian Blue, cobalt blue, an azo type pigment, a phthalocyanine type pigment, a quinacridone type pigment, an isoindolinone type pigment, a dioxane type pigment, a threne type pigment, a perylene type pigment, a thioindigo type pigment, a quinophthalone type pigment, and a metal complex pigment. Each of the above-enumerated pigments may be used alone, or two or more of the above-enumerated pigments may be used in combination. The containing quantity of the pigment with respect to the total quantity of the ink should preferably be selected within the range of 0.01 to 20 mass %.

As the dispersant, it is possible to use a wide variety of dispersants which disperse the pigment in a stable state in the solvent. Examples of preferable dispersants include hydroxyl group-containing carboxylic acid esters, salts of long-chain polyaminoamides and polymeric acid esters, salts of polymeric polycarboxylic acids, salts of long-chain polyaminoamides and polar acid esters, polymeric unsaturated acid esters, copolymers, modified polyurethanes, modified polyacrylates, polyether ester type anionic surface active agents, naphthalenesulfonic acid-formalin condensate salts, polyoxyethylene alkyl phosphoric acid esters, polyoxyethylene nonyl phenyl ethers, polyester polyamines, and stearylamine acetate. Among the above-enumerated dispersants, polymeric dispersants are more preferable.

Specifically, examples of the dispersants include the dispersants commercially available under the following trade names: Solsperse 5000 (a phthalocyanine ammonium salt type), Solsperse 13940 (a polyester amine type), Solsperse 17000, Solsperse 18000 (a fatty acid amine type), Solsperse 11200, Solsperse 22000, Solsperse 24000, and Solsperse 28000 (each of which is manufactured by The Lubrizol Corporation); Efka 400, Efka 401, Efka 402, Efka 403, Efka 450, Efka 451, Efka 453 (a modified polyacrylate), Efka 46, Efka 47, Efka 48, Efka 49, Efka 4010, and Efka 4055 (a modified polyurethane) (each of which is manufactured by EFKA Chemicals B.V.); Demol P, Demol EP, Poiz 520, Poiz 521, Poiz 530, and Homogenol L-18 (a polycarboxylic acid type polymeric surface active agent) (each of which is manufactured by Kao Corp.); Disparon KS-860 and Disparon KS-873N4 (an amine salt of a polymeric polyester) (each of which is manufactured by Kusumoto Chemicals, Ltd.); and Discole 202, Discole 206, Discole OA-202, and Discole OA-600 (a poly-chain polymeric nonionic type) (each of which is manufactured by Dai-ichi Kogyo Seiyaku Co., Ltd.). The containing quantity of the dispersant may be such that the pigment described above can be dispersed sufficiently in the ink.

In so far as the penetration drying characteristics, the jetting-out stability, and the storage stability of the ink are not affected adversely, besides the solvent, the dispersant, and the pigment described above, the ink in accordance with the present invention may also contain a dye, a surfactant, and an antiseptic agent.

The ink in accordance with the present invention may be prepared by processing, wherein all ingredients are introduced collectively or in lots into a known dispersing machine, such as a bead mill, and subjected to a dispersing process, and wherein, if necessary, the resulting dispersion is passed through a known filtering machine, such as a membrane filter. Specifically, the ink in accordance with the present invention may be prepared by the processing, wherein apart of the solvent and the entire quantities of the pigment and the dispersant are mixed uniformly, wherein the thus prepared mixture is subjected to the dispersing process by use of the dispersing machine, wherein the balance of the ingredients is added to the thus prepared dispersion, and wherein the resulting mixture is passed through the filtering machine.

EXAMPLES

The present invention will further be illustrated by the following non-limitative examples.
(Preparation of Ink)
Raw materials were premixed in accordance with each of formulations shown in Table 1 below. (Values shown in Table 1 are expressed in terms of parts by mass.) Thereafter, the resulting mixture was subjected to a dispersing process for approximately two hours in a rocking mill (65 Hz). In this manner, each of inks in Examples 1 to 10 and Comparative Examples 1 to 6 was prepared.
(Evaluation)
(Storage Stability of Ink)
As for each of the inks having been obtained in Examples 1 to 10 and Comparative Examples 1 to 6, the ink was accommodated in an enclosed vessel and was left to stand for four weeks under an environmental condition of 70° C. Thereafter, change rates of the viscosity and particle size of the ink were calculated with the formula shown below. Results of the calculations were evaluated with the criterion shown below.

[(Value of viscosity or particle size after four weeks×100)/(initial value of viscosity or particle size)]−100(%)

Excellent: Both the change rate of the viscosity and the change rate of the particle size were less than 5%.
Good: At least either one of the change rate of the viscosity and the change rate of the particle size fell within the range of 5%, inclusive, to less than 10%.
Poor: At least either one of the change rate of the viscosity and the change rate of the particle size was at least 10%.
(Transfer Staining)
Each of the inks having been obtained in Examples 1 to 10 and Comparative Examples 1 to 6 was introduced into an inkjet printer (ORPHIS-X9050, manufactured by Riso Kagaku Corporation), and a 300 dpi-equivalent solid image was printed on both surfaces of each of plain paper (Askul Multipaper Superselect Smooth, manufactured by ASKUL Corporation), reprocessed paper (Recycle PPC, manufactured by Daio Paper Corp.), and mat paper (Riso Paper IJ Mat (W), manufactured by Riso Kagaku Corporation). The degree of the transfer staining was confirmed visually and evaluated with the criterion shown below.
Excellent: No transfer staining occurred.
Good: Little transfer staining occurred.
Fair: Slight transfer staining occurred.
Poor: Transfer staining was perceptible.
(Jetting-Out Stability)
Each of the inks having been obtained in Examples 1 to 10 and Comparative Examples 1 to 6 was introduced into the inkjet printer (ORPHIS-X9050), and a printing operation was performed. Thereafter, the inkjet printer was left to stand for 30 minutes in a non-operating state. The printing operation was then begun, and the jetting-out performance obtained in this state was evaluated with the criterion shown below.
Excellent: Jetting-out non-performance did not occur.
Good: Jetting-out non-performance occurred sometimes, but was recovered by a suction cleaning operation.
Poor: Jetting-out non-performance nozzles occurred frequently.
Formulations of the inks obtained in Examples 1 to 10 and Comparative Examples 1 to 6 and the evaluation results are shown in Table 1 below.

TABLE 1

| | | Example | | | | | | | |
|---|---|---|---|---|---|---|---|---|---|
| | | 1 | 2 | 3 | 4 | 5 | 6 | 7 | 8 |
| Pigment | Carbon black MA8 | 7 | 7 | 7 | 7 | 7 | 7 | 7 | 7 |
| Dispersant | Solsperse 28000 | 4 | 4 | 4 | 4 | 4 | 4 | 4 | 4 |
| Solvent A | Mineral oil AF Solvent-6 | 23 | 30 | 42 | 30 | 35 | 30 | 30 | 23 |
| Solvent B | Bisethoxy diglycol cyclohexane dicarboxylate | 10 | 2 | 5 | | | | | |
| | Diethoxyethyl succinate | | | | 30 | 3 | | | |
| | Bisethoxy diglycol succinate | | | | | | 15 | | |
| | Polypropylene glycol succinic acid oligo ester | | | | | | | 10 | |
| | Triethylene glycol diacetate | | | | | | | | 5 |
| | Isosorbide dicaprylate | | | | | | | | |
| | Ethylene glycol monobutyl ether acetate | | | | | | | | |
| Solvent C | Isononyl isononanoate | 41 | 40 | 30 | 16 | | 29 | 49 | 45 |
| | Glyceryl tri-2-ethylhexanoate | 15 | | | 10 | | | | |
| | Diisooctyl succinate | | | | | | | | |

TABLE 1-continued

|  |  |  |  |  |  |  |  |  |
|---|---|---|---|---|---|---|---|---|
|  | Isostearyl alcohol | 17 | 12 | 3 |  | 15 |  | 16 |
|  | Isomyristyl alcohol |  |  |  | 23 |  |  |  |
|  | Total | 100 | 100 | 100 | 100 | 100 | 100 | 100 | 100 |
| Solvent proportion | Solvent A | 25.8 | 33.7 | 47.2 | 33.7 | 39.3 | 33.7 | 33.7 | 25.8 |
|  | Solvent B | 11.2 | 2.2 | 5.6 | 33.7 | 34.8 | 16.9 | 11.2 | 5.6 |
|  | Solvent C | 62.9 | 64.0 | 47.2 | 32.6 | 25.8 | 49.4 | 55.1 | 68.5 |
| Evaluation Transfer staining | Plain paper | Excellent | Excellent | Excellent | Excellent | Excellent | Excellent | Excellent | Excellent |
|  | Reprocessed paper | Excellent | Excellent | Excellent | Excellent | Excellent | Excellent | Good | Good |
|  | Mat paper | Excellent | Good | Excellent | Excellent | Excellent | Excellent | Excellent | Excellent |
| Storage stability |  | Excellent | Excellent | Excellent | Excellent | Excellent | Excellent | Excellent | Excellent |
| Jetting-out stability |  | Excellent | Excellent | Excellent | Excellent | Excellent | Excellent | Excellent | Excellent |

|  |  | Example | | Comparative Example | | | | | |
|---|---|---|---|---|---|---|---|---|---|
|  |  | 9 | 10 | 1 | 2 | 3 | 4 | 5 | 6 |
| Pigment | Carbon black MA8 | 7 | 7 | 7 | 7 | 7 | 7 | 7 | 7 |
| Dispersant | Solsperse 28000 | 4 | 4 | 4 | 4 | 4 | 4 | 4 | 4 |
| Solvent A | Mineral oil AF Solvent-6 | 30 | 30 | 50 |  |  | 30 | 79 | 30 |
| Solvent B | Bisethoxy diglycol cyclohexane dicarboxylate |  |  |  | 20 |  |  |  |  |
|  | Diethoxyethyl succinate |  |  |  |  |  |  |  |  |
|  | Bisethoxy diglycol succinate |  |  |  |  |  |  |  |  |
|  | Polypropylene glycol succinic acid oligo ester |  |  |  |  |  |  |  |  |
|  | Triethylene glycol diacetate |  |  |  | 39 |  |  |  |  |
|  | Isosorbide dicaprylate | 15 |  |  |  |  |  |  |  |
|  | Ethylene glycol monobutyl ether acetate |  | 15 |  |  |  |  |  |  |
| Solvent C | Isononyl isononanoate | 36 | 36 |  | 60 | 75 | 35 |  | 17 |
|  | Glyceryl tri-2-ethylhexanoate |  |  |  |  | 14 | 15 |  |  |
|  | Diisooctyl succinate |  |  |  |  |  |  |  | 30 |
|  | Isostearyl alcohol | 8 | 8 |  | 9 |  | 9 | 10 | 12 |
|  | Isomyristyl alcohol |  |  |  |  |  |  |  |  |
|  | Total | 100 | 100 | 100 | 100 | 100 | 100 | 100 | 100 |
| Solvent proportion | Solvent A | 33.7 | 33.7 | 56.2 | 0.0 | 0.0 | 33.7 | 88.8 | 33.7 |
|  | Solvent B | 16.9 | 16.9 | 43.8 | 22.5 | 0.0 | 0.0 | 0.0 | 0.0 |
|  | Solvent C | 49.4 | 49.4 | 0.0 | 77.5 | 100.0 | 66.3 | 11.2 | 66.3 |
| Evaluation Transfer staining | Plain paper | Excellent | Fair | Fair | Fair | Good | Good | Good | Good |
|  | Reprocessed paper | Excellent | Good | Fair | Poor | Fair | Fair | Good | Fair |
|  | Mat paper | Excellent | Good | Fair | Excellent | Poor | Poor | Poor | Poor |
| Storage stability |  | Excellent | Excellent | Poor | Excellent | Excellent | Excellent | Excellent | Excellent |
| Jetting-out stability |  | Excellent | Good | Poor | Excellent | Excellent | Excellent | Excellent | Excellent |

As clear from Table 1, with each of the inks obtained in Examples 1 to 10, which contained all of the solvent (A), the solvent (B), and the solvent (C), the storage stability and the jetting-out stability were excellent, and little transfer staining occurred. Also, with each of the inks obtained in Examples 1 to 9, in which the solvent (B) had at least two pieces of the ester group and at least two pieces of the ether group in one molecule, the transfer staining was suppressed even further, and the jetting-out stability was enhanced even further. Further, in cases where the solvent (B) was constituted of the diester that is formed from a dibasic acid and a (poly)alkylene glycol monoalkyl ether, triethylene glycol diacetate, the ester formed from an alkylene glycol, or isosorbide dicaprylate, the transfer staining was suppressed even further.

With the ink obtained in Comparative Example 1, which did not contain the solvent (C) (i.e., the ink described in Japanese Unexamined Patent Publication No. 2004-137315), which contains the hydrocarbon type solvent and the ester derivative of a (poly)alkylene glycol), the transfer staining occurred to an extent higher than with the ink in accordance with the present invention, and the storage stability and the jetting-out stability were not of allowable levels. Also, with the ink obtained in Comparative Example 2, which did not contain the solvent (A) (i.e., the ink described in Japanese Unexamined Patent Publication No. 2007-161890, which contained the fatty acid ester and the non-aqueous polar solvent, though the storage stability and the jetting-out stability were good, the transfer staining occurred markedly with respect to the plain paper and the reprocessed paper. With each of the inks obtained in Comparative Examples 3 to 6, which did not contain the solvent (B), though the storage stability and the jetting-out stability were good, the transfer staining occurred markedly in accordance with the kind of the printing medium.

As clear from the results obtained in Examples and Comparative Examples described above, with the ink in accordance with the present invention, which contains the solvent (A), the solvent (B), and the solvent (C) that is soluble in the hydrocarbon type solvent and the solvent having at least an ester group and an ether group in one molecule, the penetrability is enhanced with respect to various kinds of paper, the roller transfer staining of printed paper is suppressed, and excellent jetting-out stability and excellent storage stability are obtained.

What is claimed is:

1. An oily inkjet ink, comprising: a pigment, a pigment dispersant, and a solvent,
   wherein the solvent contains:
   i) a hydrocarbon type solvent (A),
   ii) a solvent (B) having at least an ester group and an ether group in one molecule, and
   iii) a solvent (C) that is soluble in the hydrocarbon type solvent and the solvent having at least an ester group and an ether group in one molecule.

2. An oily inkjet ink as defined in claim 1 wherein the solvent (B) has at least two pieces of the ester group and at least two pieces of the ether group in one molecule.

3. An oily inkjet ink as defined in claim 2 wherein the solvent (B) is a diester that is formed from a dibasic acid and a (poly)alkylene glycol monoalkyl ether.

4. An oily inkjet ink as defined in claim 3 wherein the diester that is formed from a dibasic acid and a (poly) alkylene glycol monoalkyl ether is at least one of the members selected from the group consisting of bisethoxy diglycol cyclohexane dicarboxylate, bisethoxy diglycol succinate, and diethoxyethyl succinate.

5. An oily inkjet ink as defined in claim 2 wherein the solvent (B) is constituted of triethylene glycol diacetate and/or isosorbide dicaprylate.

6. An oily inkjet ink as defined in claim 1 wherein the solvent (C) is constituted of at least one of the members selected from the group consisting of a higher fatty acid ester and a higher alcohol.

7. An oily inkjet ink as defined in claim 2 wherein the solvent (C) is constituted of at least one of the members selected from the group consisting of a higher fatty acid ester and a higher alcohol.

8. An oily inkjet ink as defined in claim 3 wherein the solvent (C) is constituted of at least one of the members selected from the group consisting of a higher fatty acid ester and a higher alcohol.

9. An oily inkjet ink as defined in claim 4 wherein the solvent (C) is constituted of at least one of the members selected from the group consisting of a higher fatty acid ester and a higher alcohol.

10. An oily inkjet ink as defined in claim 5 wherein the solvent (C) is constituted of at least one of the members selected from the group consisting of a higher fatty acid ester and a higher alcohol.

11. The oily inkjet ink as defined in claim 1, wherein the solvent (A) constitutes 20% by mass to 50% by mass, the solvent (B) constitutes 1% by mass to 40% by mass, and the solvent (C) constitute 20% by mass to 70% by mass of the total amount of solvent.

12. The oily inkjet ink as defined in claim 2, wherein the solvent (A) constitutes 20% by mass to 50% by mass, the solvent (B) constitutes 1% by mass to 40% by mass, and the solvent (C) constitute 20% by mass to 70% by mass of the total amount of solvent.

13. The oily inkjet ink as defined in claim 3, wherein the solvent (A) constitutes 20% by mass to 50% by mass, the solvent (B) constitutes 1% by mass to 40% by mass, and the solvent (C) constitute 20% by mass to 70% by mass of the total amount of solvent.

14. The oily inkjet ink as defined in claim 4, wherein the solvent (A) constitutes 20% by mass to 50% by mass, the solvent (B) constitutes 1% by mass to 40% by mass, and the solvent (C) constitute 20% by mass to 70% by mass of the total amount of solvent.

15. The oily inkjet ink as defined in claim 5, wherein the solvent (A) constitutes 20% by mass to 50% by mass, the solvent (B) constitutes 1% by mass to 40% by mass, and the solvent (C) constitute 20% by mass to 70% by mass of the total amount of solvent.

16. The oily inkjet ink as defined in claim 6, wherein the solvent (A) constitutes 20% by mass to 50% by mass, the solvent (B) constitutes 1% by mass to 40% by mass, and the solvent (C) constitute 20% by mass to 70% by mass of the total amount of solvent.

17. The oily inkjet ink as defined in claim 7, wherein the solvent (A) constitutes 20% by mass to 50% by mass, the solvent (B) constitutes 1% by mass to 40% by mass, and the solvent (C) constitute 20% by mass to 70% by mass of the total amount of solvent.

18. The oily inkjet ink as defined in claim 8, wherein the solvent (A) constitutes 20% by mass to 50% by mass, the solvent (B) constitutes 1% by mass to 40% by mass, and the solvent (C) constitute 20% by mass to 70% by mass of the total amount of solvent.

19. The oily inkjet ink as defined in claim 9, wherein the solvent (A) constitutes 20% by mass to 50% by mass, the solvent (B) constitutes 1% by mass to 40% by mass, and the solvent (C) constitute 20% by mass to 70% by mass of the total amount of solvent.

20. The oily inkjet ink as defined in claim 10, wherein the solvent (A) constitutes 20% by mass to 50% by mass, the solvent (B) constitutes 1% by mass to 40% by mass, and the solvent (C) constitute 20% by mass to 70% by mass of the total amount of solvent.

* * * * *